April 4, 1950  L. B. HARRIS ET AL  2,502,650
TRAILING AIRCRAFT ANTENNA
Filed Nov. 23, 1946  2 Sheets-Sheet 1
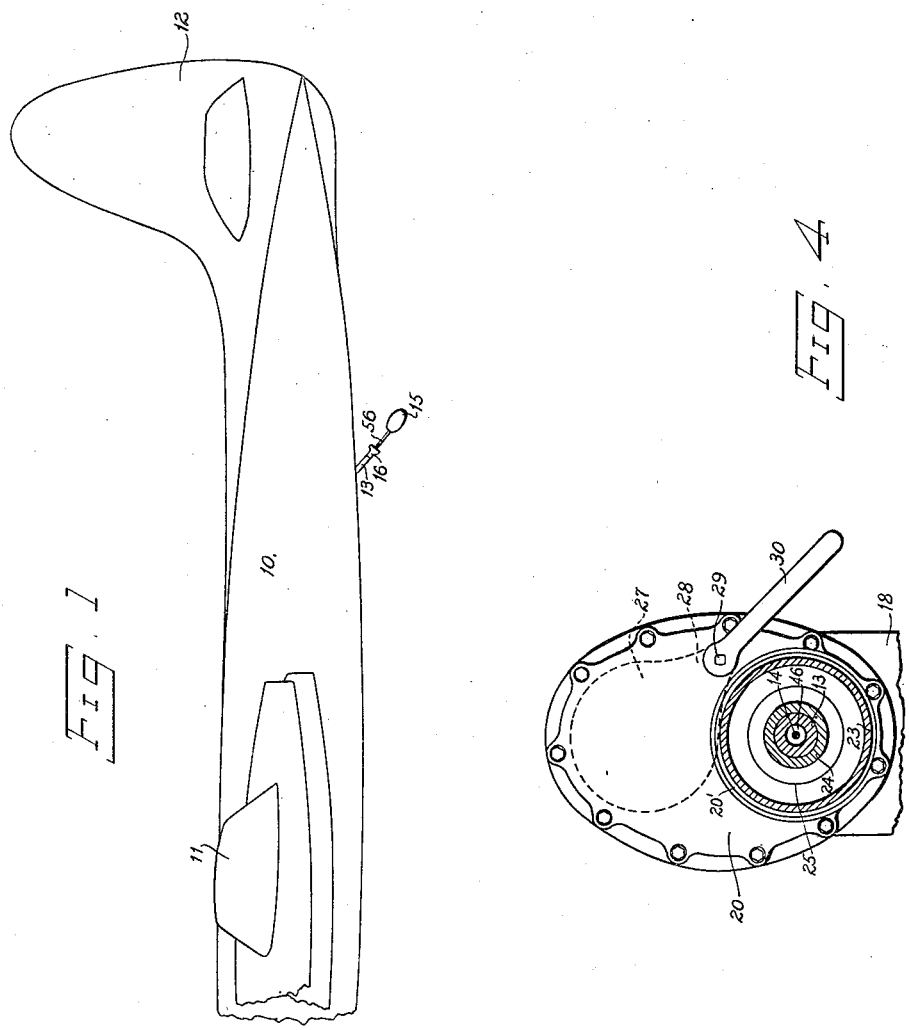
INVENTOR.
Lewis B. Harris & Leonard R. Henry
BY Charles S. Wilson
ATTORNEY.

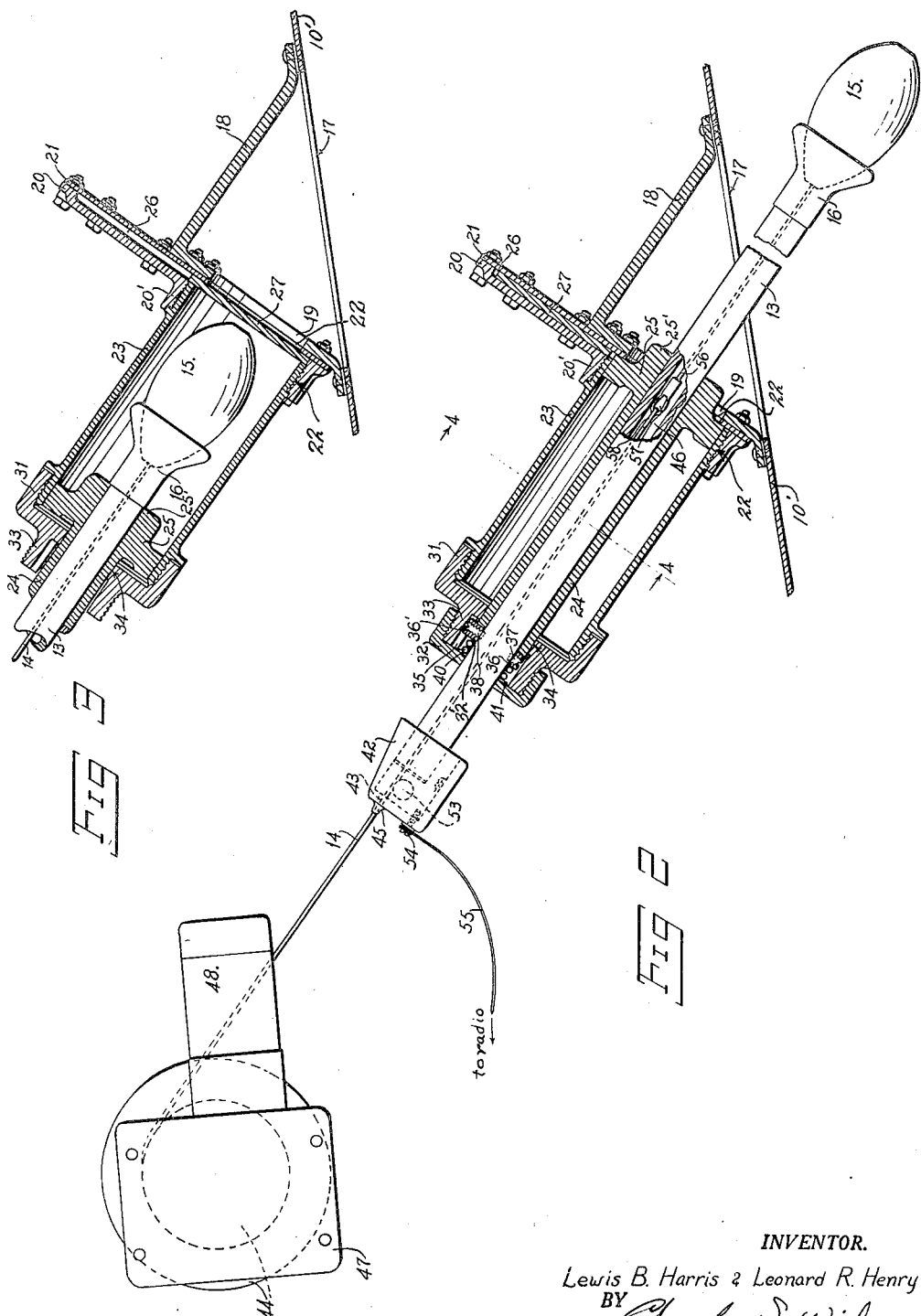

Patented Apr. 4, 1950

2,502,650

UNITED STATES PATENT OFFICE 2,502,650

TRAILING AIRCRAFT ANTENNA

Lewis B. Harris, Nassau Shores, and Leonard R. Henry, Northport, N. Y., assignors to Republic Aviation Corporation, near Farmingdale, N. Y., a corporation of Delaware Application November 23, 1946, Serial No. 711,880

17 Claims. (Cl. 244—1)

This invention relates to trailing aircraft antennas wherein a weighted flexible wire is projected and permitted to trail from an aircraft during flight for the transmission and reception of radio signals.

More particularly, this invention concerns the mounting for a trailing antenna that will enable the complete retraction of the antenna into the aircraft during flight for the repair or replacement thereof and provides means whereby the opening through which the antenna operates may be sealingly closed during the removal and/or installation of the antenna to prevent the loss of internal aircraft pressure.

While this antenna mount is particularly applicable to high altitude pressurized aircraft, its employment on non-pressurized aircraft may prove to be advantageous because of the facility or ease with which the antenna may be replaced and/or repaired in flight.

With the above and other objects in view, as will be apparent, this invention consists in the construction, combination, and arrangement of parts, all as hereinafter more fully described, claimed and illustrated in the accompanying drawings, wherein:

Fig. 1 is a side elevation of an aircraft showing an operating position for a trailing antenna constructed in accordance with the present invention;

Fig. 2 is a longitudinal section through the antenna mounting with the antenna fully retracted under normal operating conditions;

Fig. 3 is a view similar to Fig. 2 showing the antenna weight and fairlead retracted beyond its normal limit of retraction to a position within an airlock associated with the opening through which the antenna operates where they may be removed or replaced without loss of internal aircraft pressure; and Fig. 4 is a transverse sectional view taken along the line 4—4 of Fig. 2 to illustrate the means employed to seal the airlock at the skin of the aircraft.

Trailing antennas generally used on aircraft are provided with a fixed guide or fairlead for protecting antenna and directing it through an opening in the skin of the fuselage or other aircraft component and a suitable reel or bobbin on which the antenna may be wound when retracted for landing and take-off.

Modern aircraft design is largely directed to the development of speed and presently designed airplanes have speeds approaching that of sound. As a corollary to attainment of very great speed is flight at high altitudes whereupon it is necessary to maintain a differential in pressure between the tmosphere and the interior of the fuselage or cabin. For example, the pressure within the plane will be maintained as the equivalent of atmospheric pressure at a predetermined autitude, say ten thousand (10,000) feet, regardless of the excess operational altitude ultimately attained by the plane. The instant antenna mounting therefore employs an air lock surrounding and supporting the fairlead or guide through which the retracted antenna together with the fairlead may be withdrawn from its operating position and replaced without incurring a loss of air pressure from within the aircraft.

The trailing antenna for aircraft is usually positioned at or mounted in the aft portion of the fuselage with the fairlead or guide projected through a suitable opening in the underside or belly of the fuselage and at a lagging angle of approximately 45° in order to prevent undue bending or stressing of the wire at the point of emergency from the fairlead. This type of antenna, however, is obviously and inherently subject to frequent damage and deterioration and therefore has not generally been considered sufficiently reliable for high speed high altitude aircraft even though it has many desirable operating characteristics. With the proposed mounting, damage of the wire presents only a minor disadvantage since its replacement or repair can be quickly and easily accomplished, and, in the case of pressurized or high altitude aircraft, can be accomplished without the loss of pressure and the attendant danger to the occupants.

In the drawings, 10 denotes the fuselage of an aircraft having wings 11 and empennage 12. Projecting from the belly and adjacent the aft end of the fuselage 10 is a fairlead 13 through which passes the trailing antenna wire 14 having a weight 15 secured to its outer entremity. The fairlead 13 comprises a tube of insulating material and can be formed of any suitable molded plastic with an integral flared cup or socket 16 at its outer end to receive and act as a seat for the weight 15 when the antenna is fully retracted as illustrated in Fig. 2.

The fairlead 13 is mounted for reciprocation through an opening 17 in the skin 10' of the fuselage 10 independently of any movement of the wire 14 with respect to said fairlead. A bracket 18, generally angular or triangular in form, as shown in Figs. 2 and 3, spans the opening 17 and has a relatively large aperture 19 in one of its arms. The apertured arm of the bracket 18 supports on its inner face a pair of plates 20 and 21. These plates are generally elliptical in outline and each has an opening 22 in that portion or end thereof overlying the bracket 18, said openings 22 registering one with the other and with the opening 19 in the bracket. The imperforate portions or ends of the plates 20 and 21 are held in spaced parallel relationship to form or define a valve housing 26 therebetween projecting beyond the bracket 18.

The opening 22 in the plate 20 is circumscribed by an internally threaded boss 20' in which is threaded and mounted one end of a cylinder 23. Thus the cylinder 23 is positioned in alignment with the openings 22 of the plates 20 and 21 and with the opening 19 of the bracket 18. Within the cylinder 23 and surrounding the fairlead 13 is a concentric tubular guide 24 functioning as a reciprocable piston rod and carrying a piston 25 closely fitting and slidable within the cylinder. As will be apparent the piston 25 sealingly closes the openings 19 and 22 when they are open for the protraction of the fairlead 13 and the antenna (Fig. 2). When the antenna is in the operating position shown in Fig. 2, the guide or piston rod 24 is completely contained within the cylinder 23 and the leading edge of the piston 25 is firmly seated against the plate 21 where it projects into the path of movement of the piston. A concentric extension 25' is provided on the outer face of the piston 25 to project through the openings 22 and 19 when the piston reaches the outer limit of its stroke and abuts the plate 21 as aforesaid. This arrangement increases the support for the fairlead 13 when it is partially projected into the air stream.

Within the housing 26 defined by the spaced parallel alignment of the plates 20 and 21 is mounted a gate valve 27 generally circular in shape and having an eccentric lobe 28 extending from its edge. A pivot 29 piercing the plate 20 (Fig. 4) is keyed in an opening or passage in the lobe 28 of the valve 27 and is provided on its outer extremity with a lever or handle 30 located adjoining the outer surface of the plate 20. Thus the valve 27 may be operated within the housing 26 from a position where it seals or closes the opening 22 when the end of the fairlead 13 and the weight 15 are fully retracted as shown in Fig. 3 to a position between the imperforate end portions of the plates 20 and 21 for the protraction of the fairlead and antenna as shown in Fig. 2 or vice versa.

Enclosing the inner or remaining end of the cylinder 23 is a primary cap 31 threadably secured thereto having an outwardly extending concentric hollow or tubular boss 33 on which is threaded a secondary cap 32. A concentric opening 34 in the primary cap 31 slidably receives and supports the inner end of the piston rod or guide 24 so that removal of the secondary cap 32 will permit retraction of the guide 24 and the fairlead 13 to the position shown in Fig. 3. Within the boss 33 is a collar 36 surrounding the fairlead 13 and secured thereto by any suitable means such as the set screws 37 and 38 and an expansion spring 40 is interposed between this collar and a pressure seal 41 of a resilient material positioned within the secondary cap 32. The collar 36 and the fairlead are prevented from rotation within the guide or rod 24 by an extension 36' of the collar being engaged in the key way 35 in the inner face of the boss 33 and the desired degree of protraction of the fairlead 13 with reference to the guide 24 is determined by contact of the collar 36 with the extremity of the guide. Threading the secondary cap 32 on the boss 33 compresses the spring 40 between the collar 36 and the resilient seal 41 causing the latter to completely seal the concentric opening 32' in said secondary cap 32 through which the fairlead 13 passes to prevent loss of pressure from the cabin of the aircraft when the fairlead is in its fully protracted or operating position.

On the inner end of the fairlead 13 is an insulating block 42, sealingly closing the longitudinal passage 46 of the fairlead 13 except for the passage 43 which receives and guides the antenna 14 from the bobbin or reel 44 to the passage 46 in the fairlead. A resilient seal 45 encircling the antenna 14 at the entrance to the passage 43 completely seals the passage 46 while permitting reciprocation of the antenna 14 within the fairlead 13 and block 42. The block 42, carries means for slidably contacting the antenna 14 in the form of a metallic roller 53 electrically connected to a suitable terminal 54 for attachment of the radio leading wire 55.

The antenna 14 is fastened to the reel 44 which may be rotatably mounted in any convenient position adjoining the inner end of the fairlead 13. In the illustration the reel 44 is mounted on a suitable plate 47 with the point of departure of the antenna from the reel being in substantial alignment with the passages 43 and 46 in the fairlead sealing member 42 and the fairlead 13 respectively. A remotely controlled reversible electric motor 48 is mechanically coupled to the reel for rotating it to wind or unwind the antenna 14 and manifestly any other type of reel or bobbin and operating means may be used. The weight 15, on the free or outer end of the antenna 14, is provided with a short lead wire 56 suitably fastened thereto having an eye 57 for engagement with a corresponding eye 58 formed on or fastened to the antenna 14.

Fig. 2 illustrates the normal operating condition of the present antenna mounting. The piston 25 is situated at the outer end of the cylinder 23 to sealingly close the openings 22 and 19 and is there held against movement relative to the cylinder by the cap 32 and the spring 40. The fairlead 13 then projects outwardly of the fuselage 10 and is held in its predetermined projected position by the cap 32 and spring 40, the normal projected position of the fairlead being variable by changing the position of the collar 36 thereon. Thus both the fairlead 13 and the rod or guide 24 and piston 25 are substantially immovable within the cylinder 23 and relatively to each other.

To replace or repair a damaged antenna 14 during flight, the secondary cap 32 is first removed from its position on the boss 33 and both the resilient seal 41 and spring 40 are withdrawn. The fairlead 13 is then retracted to a point at which the cup 16 contacts the leading face of the piston 25 whereupon both the piston and the fairlead are forcibly retracted until the inner face of the piston completely traverses the length of the cylinder 23 and contacts the primary cap 31. It will be noted at this point that although the resilient seal 41 has been removed, the close tolerances maintained between the fairlead 13 and the piston rod or guide 24 and between the piston 25 and the cylinder 23 prevents any material loss of air pressure through the cylinder. Upon the complete retraction of the fairlead, the gate valve 27 is then swung by means of the handle 30 to a position covering and sealing the openings 22 and 19. The positioning of the valve 27 in this manner provides an effective seal since the pressure within the cabin is greater than the outside pressure and this differential acts to force the valve firmly against its seat. With the cup 16 and the weight 15 in the retracted position shown in Fig. 3 the primary cap 31 is then removed from the cylinder 23 and the fairlead 13 together with the guide 23 are withdrawn into the aircraft. Upon the completion of necessary repairs the fairlead 13 and the guide 24 are replaced in the cylinder 23 and the primary cap 31 repositioned thereon. The valve 27 is then removed from the openings 22 and both the piston 25 and the fairlead 13 are returned to their normal operating positions as shown in Fig. 2. The spring 40 and the resilient member 41 are then replaced and retained in position by the secondary cap 32.

While the instant invention has been described in connection with a flexible trailing antenna, it may be equally adaptable for use with semi-rigid or rigid antennas on pressurized aircraft where it may be desired to alter the length of the antenna projecting therefrom or even replace it with another antenna for use on an alternate radio frequency or range of radio frequencies.

What is claimed is:

1. The combination with an aircraft having an opening in its skin, of an antenna mounting associated with said opening comprising a fairlead normally projecting through said opening, a cylinder surrounding said fairlead and circumscribing said opening, a sealing member carried by said cylinder for closing said opening during the projection of said fairlead, means for withdrawing the sealing member and fairlead from the opening and inwardly of the cylinder, and seals for the inner end of said cylinder.

2. The combination with an aircraft having an opening in its skin, of an antenna mounting associated with said opening comprising a fairlead normally projecting through said opening, a cylinder surrounding said fairlead and circumscribing said opening, a sealing member carried by said cylinder for closing said opening during the projection of said fairlead, means for withdrawing the sealing member and fairlead from the opening and inwardly of the cylinder, an independent closure for the outer end of the cylinder operable upon the withdrawal of the fairlead and sealing member as aforesaid, and a closure for the inner end of said cylinder removable after the withdrawal of the fairlead and sealing member as aforesaid to permit the complete removal of the fairlead and associated parts from the cylinder.

3. In an aircraft having an opening in its skin, a trailing antenna mount comprising a reciprocable fairlead defining a passage therein which in its operative position projects through said opening, an antenna extending through the passage in said fairlead, a cylinder surrounding the fairlead and fixedly secured at one of its ends at the edge of said opening, reciprocable means interposed between the cylinder and fairlead for supporting the fairlead and sealing the space between the cylinder and the fairlead, and a gate valve associated with the fixed end of said cylinder for closing the opening upon retraction of the fairlead and the antenna into the cylinder.

4. In an aircraft having an opening in its skin, an antenna assembly comprising a reciprocable tubular fairlead of insulating material projecting in one position through said opening, means within the aircraft supporting said fairlead consisting of a bracket having an aperture in alignment with said opening, a cylindrical housing secured at one of its ends to said bracket in registration with said aperture, a piston slidable within said housing to support the fairlead for reciprocation relative thereto, an annular cap on the other end of said housing slidably engaging and supporting one end of said piston, means associated with said cap for sealing the gap between it and the fairlead, a gate valve interposed between the bracket and the housing to close the aperture aforesaid upon retraction of the fairlead and the piston, and an antenna extending through the fairlead aforesaid and reciprocable with respect thereto.

5. The combination with an aircraft component having an opening in its skin, of a cylinder situated within the component and at one of its ends circumscribing said opening, a hollow piston rod concentrically mounted in said cylinder, a piston carried by said rod to normally close the skin opening of the aircraft component and having an opening therethrough in axial alignment with the passage of said rod, an insulating tube extending through said rod and piston to normally project beyond the inner end of said cylinder at one of its ends and through the opening in the skin of the aircraft component at its opposite end when said piston closes said opening in the skin, a primary cap affixed to the inner end of said cylinder having a concentric opening therein for the passage of the rod and tube, an outstanding boss on said primary cap surrounding said opening, a secondary cap affixed to said boss to prevent movement of the piston and its rod relative to said cylinder and of the tube relative to the rod and removable to permit such movements, a valve mounted to close the opening in the skin of the aircraft component upon the removal of the piston and tube from operative association with the skin opening, and an antenna passing longitudinally through said tube.

6. The combination with an aircraft component having an opening in its skin, of a cylinder situated within the component and at one of its ends circumscribing said opening, a hollow piston rod concentrically mounted in said cylinder, a piston carried by said rod to normally close the skin opening of the aircraft component and having an opening therethrough in axial alignment with the passage of said rod, an insulating tube extending through said rod and piston to normally project beyond the inner end of said cylinder at one of its ends and through the opening in the skin of the aircraft component at its opposite end when said piston closes said opening in the skin, a composite cap affixed to the inner end of said cylinder to seal the cylinder and prevent movement of the rod and piston within the cylinder or of the tube within the rod and piston, means whereby a portion of said cap may be removed from said cylinder to permit relative movement of the rod and tube and of the rod together with the piston and the cylinder thereby retracting the outwardly projecting end of the tube and withdrawing the piston from the opening in the skin of the aircraft component, a valve operable to close the opening in skin of the aircraft component upon the withdrawal of said piston and the retraction of said tube as aforesaid, means whereby the remainder of the cap may be removed from the cylinder to permit the removal of the tube, rod and piston from the cylinder after the aforesaid valve has been positioned to close the opening in the skin, and an antenna wire extending through said tube having a reel within the aircraft component associated with its inner end and a weight attached to its outer end.

7. The combination with a vehicle having an opening in its skin, of an antenna assembly comprising a retractable non-metallic tube normally located in said opening, an airlock surrounding said tube having one end in registration with said opening, a closure operable between said lock and opening to close the latter upon retraction of the tube into the airlock, means surrounding the tube for closing the end of the airlock opposed to said opening, and an antenna extending through and projecting from said tube.

8. In an aircraft having an opening in its skin, an antenna assembly comprising a bracket having an aperture aligned with said skin opening, a cylinder mounted on said bracket and sealingly circumscribing said aperture, a piston and hollow piston rod mounted within said cylinder, said piston being designed to normally close and seal the aforesaid aperture, a fairlead mounted for independent longitudinal movement in the piston and its rod, a closure associated with the end of the cylinder remote from the bracket through which the fairlead and piston rod pass and relative to which they may move, means cooperating with said closure to seal the joint between it and the piston rod including means to lock the piston rod and piston against movement with respect to the cylinder as well as the closure, a gate valve operable to close the aperture in the bracket and the adjacent end of the cylinder upon the withdrawal of the piston from its normal position, and an antenna extending through the fairlead and capable of independent movement relative thereto.

9. In an aircraft having an opening in its skin, an antenna assembly comprising a cylinder aligned with and sealingly circumscribing said opening, a piston and hollow piston rod mounted for reciprocation within the cylinder, said piston being adapted to normally close one end of the cylinder whereupon the piston rod is contained substantially within the cylinder, a cap removably secured to the opposite end of the cylinder, a releasable lock between said cap and the piston rod to hold the piston rod and piston in its normal position and against movement within the cylinder, a fairlead mounted for reciprocation in the piston rod and piston, and an antenna mounted for independent movement within the fairlead.

10. In an aircraft having an opening in its skin, an antenna assembly comprising a cylinder aligned with and sealingly circumscribing said opening, a piston and hollow piston rod mounted for reciprocation within the cylinder, said piston being adapted to normally close one end of the cylinder whereupon the piston rod is contained substantially within the cylinder, a cap removably secured to the opposite end of the cylinder, a releasable lock between said cap and the piston rod to hold the piston rod and piston in its normal position and against movement within the cylinder, a fairlead mounted for reciprocation in the piston rod and piston, a closure for that end of the cylinder normally closed by the piston aforesaid movable to its operative position upon the withdrawal of the piston and outer end of the fairlead of the cylinder, and an antenna cooperating with the fairlead and mounted for independent movement relative thereto.

11. In an aircraft having an opening in its skin, an antenna assembly comprising a cylinder aligned with and sealingly circumscribing said opening, a piston and hollow piston rod mounted for reciprocation within the cylinder, said piston being adapted to normally close one end of the cylinder whereupon the piston rod is contained substantially within the cylinder, a cap removably secured to the opposite end of the cylinder, a releasable lock between said cap and the piston rod to hold the piston rod and piston in its normal position and against movement with the cylinder, a fairlead mounted for reciprocation in the piston rod and piston, said fairlead normally projecting beyond said piston and through the opening in the skin of the aircraft, an antenna extending through said fairlead and having an independent reciprocable movement therein, and a gate valve associated with that end of the cylinder normally closed by the piston aforesaid and operable upon the release of the aforesaid lock and the withdrawal of the piston and fairlead together with the retracted antenna into the cylinder.

12. The combination with an aircraft having an opening in its skin, of a trailing antenna assembly comprising a retractable fairlead to be projected through said opening when in its operative position, a cylinder encircling said fairlead and opening, a valve coacting with one end of the cylinder for sealing the opening and cylinder upon the retraction of the fairlead into the cylinder, reciprocable means within the cylinder for supporting the fairlead and to seal said opening at one end of the cylinder during the projection of the fairlead, independent sealing means for the other end of the cylinder removable from the cylinder for the complete withdrawal of the fairlead from the cylinder after its retraction into the cylinder and the closing of said valve, and an antenna reciprocatingly mounted within and extending beyond the ends of the fairlead.

13. The combination with an aircraft fuselage wherein at least a portion thereof has a constant internal pressure greater than the surrounding atmospheric pressure and having an opening in its skin, of a retractable antenna to be projected through said opening, and an air lock surrounding said antenna and associated with said opening, organized and arranged to permit the removal and replacement of said antenna upon its retraction into the air lock while maintaining the pressure in the fuselage.

14. The combination with a pressurized aircraft component having an opening in its skin, of a fairlead normally to be projected through said opening and retractable on occasion therefrom, a primary closure associated with said fairlead and normally fixed against movement in and sealing said opening upon the projection of said fairlead, means for releasing said closure and thereby permitting the removal of it with the fairlead from the opening, and a secondary closure for sealing said opening upon the complete retraction of said primary closure and of the fairlead therefrom.

15. The combination of an aircraft component having an opening in its skin, of a fairlead normally projecting through said opening and retractable on occasion therefrom, a closure associated with said fairlead and normally fixed against movement in and sealing said opening upon the projection of the fairlead, means for releasing said closure and fairlead for the retraction thereof from the opening, and means for sealing said opening upon the retraction of the fairlead and the removal of the closure from said opening.

16. An airtight mounting for a trailing antenna on an aircraft having an opening in its skin comprising a reciprocable tubular guide projecting through said opening in its normal operating position and having an antenna reciprocatingly mounted therein, a cylinder circumscribing said guide and opening, a valve associated with said cylinder to close and seal said skin opening and one end of the cylinder upon the retraction of the guide into the cylinder, a support within the cylinder coacting with the guide in all of its positions relative to the cylinder including means adapted to seal said opening and cylinder upon the projection of the guide, and a removable, composite cap sealing the other end of said cylinder including releasable means to lock the guide against movement in its projected position, whereby the release thereof permits the partial retraction of both the guide and support from cooperation with the skin opening to allow the closing and sealing of the latter by the valve as aforesaid, and the removal of the entire cap from the cylinder permits complete withdrawal of said guide and support from said cylinder during the sealing of the opening and cylinder by said valve.

17. In a pressurized aircraft, having an opening in its skin, the combination with a reciprocable tube for guiding an antenna through said opening, of an airlock within said aircraft associated with said opening to permit the simultaneous removal of the tube and antenna while maintaining the pressure within the aircraft comprising a cylindrical housing surrounding said tube, a gate valve coacting with one end of the housing and the opening to seal the opening upon the retraction of the tube into the housing, and composite sealing means on the other end of said housing consisting of two sections, one section for locking the tube against movement relative to the housing and releasable to enable the partial retraction of the tube and antenna to a position within the housing thereby clearing the opening aforesaid for cooperation with the gate valve and the other section, either alone or with the first section, being removable from the housing to enable the complete withdrawal of the tube and antenna from the housing while the housing is sealed by said gate valve.

LEWIS B. HARRIS.
LEONARD R. HENRY.

REFERENCES CITED

The following references are of record in the file of this patent:

UNITED STATES PATENTS

| Number | Name | Date |
| --- | --- | --- |
| 1,156,970 | Bonard | Oct. 19, 1915 |
| 1,188,308 | Nyquist | June 20, 1916 |
| 1,858,336 | Mirick | May 17, 1932 |
| 2,137,450 | Green | Nov. 22, 1938 |
| 2,249,836 | Lear | July 22, 1941 |
| 2,362,298 | Newell | Nov. 7, 1944 |